United States Patent [19]
Loomis et al.

[11] Patent Number: 5,634,429
[45] Date of Patent: Jun. 3, 1997

[54] BIRD FEEDER USING RECYCLABLE CONTAINERS

[76] Inventors: Thomas H. Loomis, 11 Smith Points Rd., Manchester, Mass. 01944; William J. Felkner, 79 Alden Ave., Warwick, R.I. 02889

[21] Appl. No.: 428,021

[22] Filed: Apr. 25, 1995

[51] Int. Cl.⁶ .................................................. A01K 39/01
[52] U.S. Cl. ........................ 119/52.2; 119/57.8; 215/386
[58] Field of Search ............................ 119/57.8, 57.9, 119/52.2, 52.3, 77; 222/569, 570, 526, 547; 215/386, 392, 400, 41

[56] References Cited

U.S. PATENT DOCUMENTS

| | | |
|---|---|---|
| 214,545 | 4/1879 | Bacon . |
| 217,020 | 7/1879 | Moreland . |
| 255,642 | 3/1882 | Lubin ........................ 215/386 |
| 1,164,161 | 12/1915 | Ayers . |
| 2,216,511 | 10/1940 | Copeman ................. 119/52.2 |
| 2,521,259 | 9/1950 | Shea ........................... 119/77 |
| 2,591,126 | 4/1952 | Breck, Jr. . |
| 2,591,459 | 4/1952 | Meany ..................... 119/52.3 |
| 2,690,861 | 10/1954 | Tupper ..................... 222/569 |
| 2,808,028 | 10/1957 | Landgraf . |
| 3,308,998 | 3/1967 | Opasser et al. ........... 222/569 |
| 3,390,897 | 7/1968 | Moore . |
| 3,742,914 | 7/1973 | Spencer et al. ........... 119/52.2 |
| 4,732,112 | 3/1988 | Fenner et al. . |
| 4,896,628 | 1/1990 | Kadunce . |
| 5,183,005 | 2/1993 | Tyler ........................ 119/52.2 |
| 5,269,242 | 12/1993 | Toldi . |
| 5,303,674 | 4/1994 | Hyde, Jr. ..................... 119/77 |
| 5,423,291 | 6/1995 | Daughterty .............. 119/52.2 |
| 5,479,879 | 1/1996 | Biek ......................... 119/52.2 |

FOREIGN PATENT DOCUMENTS

240252  5/1965  Austria .................................. 222/547

Primary Examiner—Todd E. Manahan
Attorney, Agent, or Firm—William J. Daley, Jr.

[57] ABSTRACT

The invention features a feed conduit tube for a bird feeder and also features a bird feeder including at least one of these feed conduit tubes, at least one feed container and a feed tray. The feed container stores or holds the bird feed and has a neck. One end of the feed tube, the first end includes a tapered portion and a projection or detente for securing the first end to the storage container. The other end includes at least one notch that cooperates with surfaces of a through hole opening in the tray to secure the tray to a second end of the feed tube. The feed trays are detachable from the feed tube and come in different size and configurations. The bird feeder is configurable with a single feed container or multiple containers feeding a single tray. Also featured is a bird feeding device where the feed conduit tube is in two sections that are threadably secured to each other. One of these tubes is secured to or formed along with the feed tray to form an integral structure.

41 Claims, 5 Drawing Sheets

BIRD FEEDER USING RECYCLABLE CONTAINERS

FIELD OF INVENTION

This invention relates generally to devices for feeding animals and more particularly to devices for dispensing seed or pelleted food to birds.

BACKGROUND OF THE INVENTION

The metabolism of most birds requires them to consume large amounts of food in proportion to their sizes. Unless the bird is domesticated, the supply of food is not always readily available, particularly in the colder seasons. Wild birds will move from one area to the next looking for what small morsels they are able to find. Because of this behavior wild birds will, with seeming gratitude, quickly consume food provided to them by man.

From the domestic canary to the wild bird of prey, people enjoy watching and being close to birds. The desire for people to draw birds closer to their homes has led to various feeding devices. These devices range from very simple dispensers to rather complex forms aimed at being more decorative than functional.

Presently, bird feeders come in many different designs; post mounted, cantilevered from a window sill and hung from a bracket or tree. The materials include wood, glass and plastic. Most designs hold several days supply of feed. Large heavy feeders are generally post mounted. More common are lightweight feeders that can be mounted or hung by a variety of means. Some examples of bird feeders are disclosed in U.S. Pat. Nos. 5,269,242; 4,896,628; and 2,591,126.

All of these bird feeders share a common characteristic, the bird feeder is constructed with components specifically designed for use in a bird feeder. In particular, the food storage container for most of these bird feeders, and for conventional bird feeders in general, represents a large percentage of the materials used to make the bird feeder, the size of the container/product being sold and necessarily the cost of the bird feeder.

There is disclosed in U.S. Pat. No. 4,732,112 a bird feeder that uses a common screw neck container such as 3-liter plastic soft drink bottle. The bird feeder consists of a screw necked feed container, an annular connecting member, a conduit that controls the flow of feed, a feed cup, an internal hood to prevent seed from overflowing the feed cup, and a perch. The conduit, feed cup and annular member are adhesively secured, integrally molded or otherwise fastened to each other so when the annular member is screwed onto the necked end of the container, bird feed automatically flows into the feed cup. The internal hood protects the cup from the elements and the perch is located about the cup so birds can alight on the perch while feeding.

This bird feeder design is limited to using those containers that have a screw top neck because a screwed connection is used to connect the conduit, annular member and feed cup to the feed container. There are, however, a number of throw-away plastic containers that do not have screw top necks that are commonly found in households. These container are commonly used for milk, orange juice, water, many clumping cat litters, as well as containers in which bird seed is sold. Further, screw top containers fall into a category of containers where state governments, such as Maine and Massachusetts, have implemented laws and regulations for their sale and disposal. For example, the container is sold with a deposit required thereby encouraging consumers or others to return the containers back to a store to get back the deposit.

The above described bird feeders, and conventional bird feeders in general, have a fixed size design (e.g., fixed size feed tray) so they have no real capability or flexibility to be re-configured or re-sized by the consumer after being purchased. In addition, the feed containers for conventional bird feeders are fixed capacity containers. Thus, a consumer has no way to control the types of birds being attracted by changing the size of the container and/or the size of the feeding tray after purchasing the bird feeder.

In today's society, because of the quantity and types of materials (e.g., plastic bottles, etc.) being used in households and because of the concern with disposal of these materials, there are programs being put in or already in place to recycle materials particularly plastic bottles. However, it is also desirous to adapt materials or products produced for one purpose (e.g., milk, orange juice, and water containers) to other uses. Adapting materials or products for additional uses reduces the amount of materials that have to be disposed off and/or recycled.

Therefore, it is an object of the present invention to provide an improved bird feeder where the size of the feed storage container and the feed tray is selectable and adjustable by the user.

It is another object of the present invention to provide a feed tube that interconnects to the storage container by engaging interior surfaces in the neck of the container and that detachably interconnects to the feed tray and more particularly a feed tube that is detachably interconnected to the storage container.

It is a further object of the present invention to provide a bird feeder where the feed tube and feed tray are secured to the feed storage container without using a plastic container having a threaded neck.

It is yet a another object of the present invention to provide a bird feeder that re-uses plastic containers found in households as the feed or food storage container.

It is yet a further object of the present invention to provide a bird feeder which is adaptable to use feed trays of different configurations and sizes.

It is still yet another object of the present invention to provide a bird feeder where the feed tray can be secured to multiple feed storage containers.

It is still yet a further object of the present invention to provide a bird feeder that is simple to use and inexpensive.

SUMMARY OF THE INVENTION

The bird feeder of the subject invention results from the realization that common household plastic containers such as those used for milk, orange juice and water are re-useable as feed storage containers for a bird feeder by using a feed tube adapted to engage interior surfaces in the mouth or neck of the plastic container. The subject invention also results from the realization that the feed tube is also adaptable for use with feed trays of different sizes and configurations.

More particularly, the subject invention features a novel feed conduit tube for interconnecting a storage container and a feed tray; it features a bird feeder having a single container and feed tray that are interconnected by a feed conduit tube; and it features a bird feeder having a plurality of feed containers that are each interconnected with a feed conduit tube to feed the feed tray, in particular a single feed tray. The plurality of feed containers can offer the same feed type or different feed types thus broadening the kinds of birds a consumer can draw to the bird feeder.

The feed conduit tube includes a hollow tube having first and second ends. The first end includes a first end securing means for securing the tube to the container neck. The securing means further includes means for engaging interior surfaces of the container neck to secure the first end to the container. The tube second end includes a second end securing means for securing the second end of the tube to the tray. See the discussion below for the size and shape of feed trays useable with the feed conduit tube of the instant invention.

In preferred embodiments, the engaging means includes a tapered end portion for guiding and positioning the tube first end in the neck of the container and a locking lip, proximate the tapered end portion and extending outward from the tube's outer surface. The locking lip secures the tube first end under a lip in the container's neck or the mouth of the container. The locking lip extends circumferentially about at least a portion of the tube outer surface and the securing means further includes stops so the locking lip is disposed under the lip of the container neck.

The second end of the bird feeder feed conduit tube further includes means for dispensing the bird feed to the feed tray. The dispensing means includes at least one aperture through the outer surface of said tube, so that feed passes through said at least one aperture onto the tray. More particularly, there are two diametrically opposed apertures in the tube outer surface for dispensing feed to the feed tray.

The second end securing means includes at least two finger portions extending in a direction parallel to a longitudinal axis of the feed tube, where at least one finger portion includes at least one ridge. The finger portions are inserted into a corresponding receptacle in the feed tray and the at least one ridge secures said second tube end to the tray. Preferably, there are two ridges for each finger portion to secure the second tube end to the tray. In a further embodiment, each finger portion extends below the tray and an aperture, transverse and radial to the tube longitudinal axis, is provided in each portion below the tray for at least two opposing finger portions. A pin is passed through the apertures in the finger portions thereby providing further support for the tray.

The subject invention also features a bird feeding device, for dispensing feed to birds, that is interconnected to at least one storage container of bird feed. The feeding device includes at least one hollow tube, one for each storage container and each having first and second ends; a feeding tray; and removable securing means for securing each hollow tube second end and the feeding tray so each hollow tube is removably secured to the feeding tray. Each hollow tube first end includes a first securing means for securing the at least one hollow tube to the corresponding container. The first securing means includes engaging means for engaging interior surfaces of the container neck thereby securing the first end to the container.

In preferred embodiments, the engaging means of the feeding device includes a tapered end portion for guiding and positioning the tube first end in the neck of the container; and a locking lip, proximate the tapered end portion and extending outward from an outer surface of the tube, that secures the tube first end under a lip in the container neck. The feeding tray includes a tray section having a feeding surface and a hollow tubular section extending essentially normal to the feeding surface and having a first end, where the removable securing means includes means for securing the tubular section first end to the hollow tube second end. The tubular section first end or the hollow tube second end includes a male threaded connection and the other includes a female threaded connection so the tubular section first end and the hollow tube second end are threadably secured. Alternatively, the removable securing means includes a pop-lock connection for removable securing the tubular section first end to the hollow tube second end.

Preferably, the hollow tubular section and the tray section are bonded together, for example by using epoxy glue to form a unitary structure. In another embodiment, the hollow tubular section and the tray section are integrally molded as a unitary structure. For example, the tubular section and tray section are molded as a single plastic part. Alternatively, the tubular section and tray section are integrally formed as a unitary structure.

As with the above described feed conduit tube, the hollow tubular section includes at least one and more particularly two apertures in the tubular section for dispensing bird feed onto the tray section. The feeding device can also be used with a plurality of storage containers, where the feeding tray includes a plurality of hollow tubular sections each extending from the feeding surface and where the removable securing means secures each hollow tube second end to each hollow tubular section first end. See the discussion below for the size and shape of feed trays useable with the feeding device of the instant invention.

The above described novel feed conduit tube or feeding device is used in a novel bird feeder having a container for holding bird feed and a feed tray. The feed tray is a circular tray that has a diameter in the range of from about 6 inches to about 24 inches. Alternatively, the feed tray is rectangular in shape and has a width in the range of from 8 to 10 inches and a length in the range of from about 12 to 24 inches. The feed tray, however, may be of any geometric shape and have different sizes from that provided above dependent upon the ability of the configured tray to be capable of feeding birds and providing a stable and secure feeding perch. These geometric shapes can be connected to each other to produce a longer feeding tray with multiple feed containers and feed conduit tubes (see also FIG. 5B discussion).

In an alternate embodiment, a bird feeder of the instant invention includes at least one container and preferably a plurality of containers for holding the bird seed, a single feed tray and at least one feed conduit tube for each container. The feed tube used in conjunction with either of the above described bird feeders has the features described herein above for the novel feed conduit tube of the instant invention. Alternatively, the bird feeder is configured with a bird feeding device as herein described above, where the feeding tray includes at least one hollow tubular section that is interconnected (e.g., threadably interconnected) to the feed tube.

The storage container for the bird feed is preferable one of a number of common plastic containers found in the house hold. The most common plastic containers in households, useable as a feed storage container, are blow molded plastic containers such as those used for milk, orange juice, water and many clumping cat litters. These containers come in many different sizes including gallon, half-gallon, quart and pint sizes. In addition, these type of plastic containers are typically used by bird seed packagers to package the bird seed for sale to consumers.

The feed conduit tube and the trays are detachably connected so a user can select and change the size and tray configuration needed to attract the birds of interest. In addition, the size of the feed container can be adjusted to the kind of bird being attracted as well as for the type of bird feed being dispensed. Thus, with the feed tube and bird feeders of the instant invention, a consumer has the flexibility to configure and re-configure the bird feeder to one of a number of possible configurations without having to purchase a bird feeder specifically designed for each application/use.

DESCRIPTION OF THE PREFERRED EMBODIMENT

Figure 1:
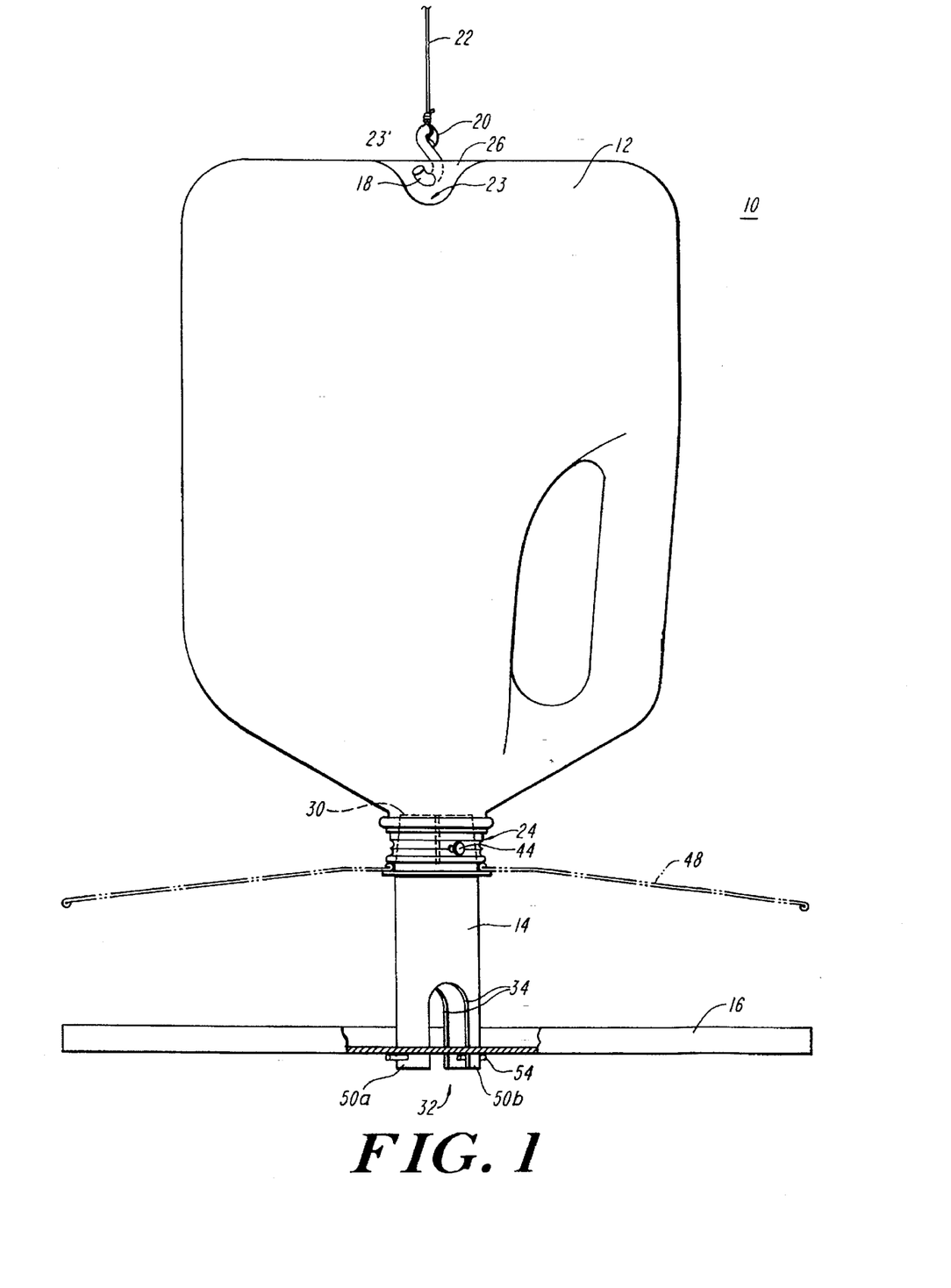
FIG. 1 is a side view of one embodiment of a bird feeder according to the instant invention.
Figure 6:
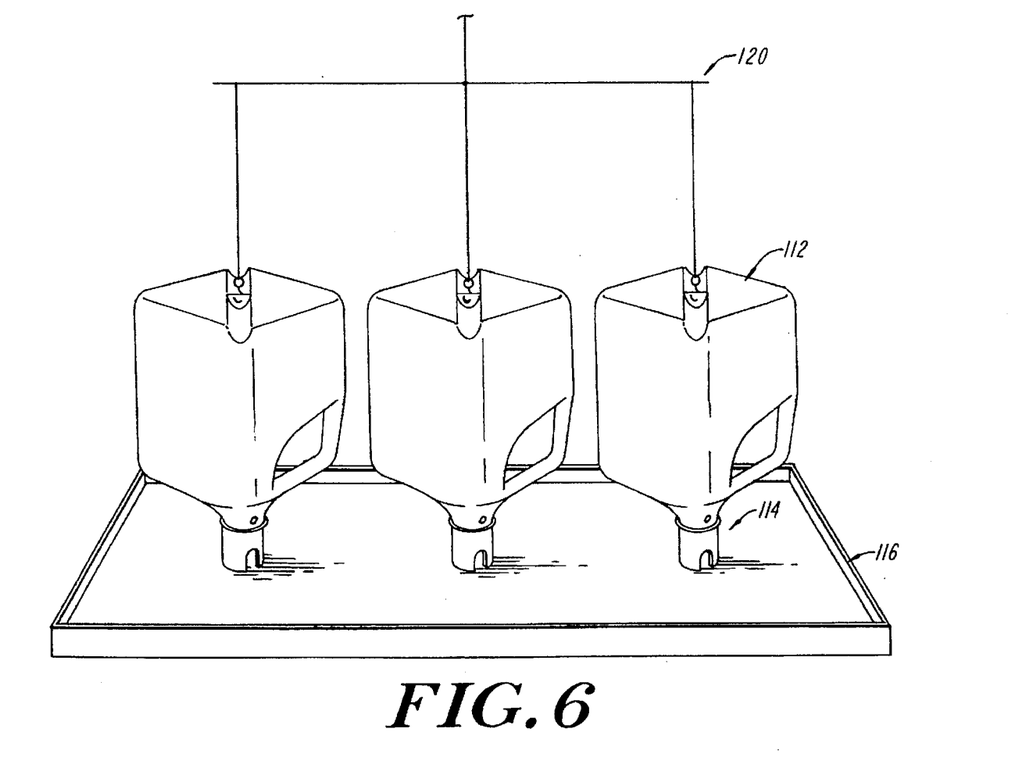
FIG. 6 is a side view of another embodiment of a bird feeder having multiple bird feed containers.

As shown in FIG. 1, the bird feeder 10 of the instant invention includes a feed storage container 12, a feed tube or feed conduit tube 14, and a feed tray 16. In this embodiment, the feed tray 16 is supplied by a single feed storage container 12. Alternatively, as shown in FIG. 6, the bird feeder of the instant invention is configurable with a plurality of feed storage containers 112.

The feed storage container 12, is any one of a number of plastic storage containers commonly found and used in most households. The most common plastic containers in households, useable as a feed storage container 12, are blow molded plastic containers such as those used for milk, orange juice, water and many clumping cat litters. These containers come in many different sizes including gallon, half-gallon and quart sizes. In addition, these type of plastic containers are used by bird seed packagers to package bird seed for sale to consumers. In general the house hold containers useable for the instant invention includes a lip in the container neck. The feed conduit tube 14 of the instant invention is sized so that it will engage the interior surfaces in the neck region for most known plastic containers being used in the household.

After the household container has been emptied of its contents (e.g., emptied of the water or orange juice), and cleaned if necessary, the bird feed or pelleted feed to be dispensed is put into the plastic container so it is now a feed storage container 12 for a bird feeder. As described in connection with FIG. 2, one end, the feed tube first end 30, is secured to the neck 24 of the feed storage container 12 and the feed tray 16 is secured to the feed tube second end 32.

Most blow molded plastic bottles have a valley 18 that extends across at least a portion of the bottom of the plastic container and a brace rib or rib 26 that is transverse to the bottom valley 18. This valley/rib 18,26 feature is adaptable for use as the attachment point for an S-hook 20 by making cuts below and on each side of the rib 26, in the valley region 18. One end of the S-hook 20 is inserted through the opening created by the cuts, brought out the other side of the brace rib 26 and is thereby secured under the bottom brace rib 18.

A wire or string 22 is attached to the other end of the S-hook 20 so the bird feeder 10 is hung from and secured to a tree branch or to a feeder hanger attached to the side of a house, to a pole or to other vertically extending structures. It should be recognized that there are numerous techniques known to those skilled in the art for securing and hanging a container from a tree branch or feeder hanger. For example, a wire or string is strung horizontally between two trees, posts or brackets and the storage container 12 is hung from the horizontally strung wire or string (e.g. by passing the wire/string through the opening created by the cuts on each side of the rib 26). In another fashion, a string or wire is secured to the container bottom such as by lacing it through holes in the bottom to create a triangular shaped hanger from which the container 12 and bird feeder 10 is hung.

Once the bird feeder 10 is assembled, the feed storage container 12 is turned upside down so the container neck 24 is pointed downwards. In this way, gravity causes the bird feed or pelleted feed to travel through the hollow feed tube 14 and to be dispensed out through the feed holes 34 in the side of the feed tube 14 onto the feed tray 16. As bird feed is consumed by the birds, gravity causes additional bird feed to be dispensed in the above described fashion to the feed tray 16.

The feed holes 34 are sized to regulate the feed being dispensed based on the type of feed expected to be used and the expected size of the feed tray 16. For example, for the same size feed hole 34 a smaller size feed such as millet will be dispensed faster and further on a feed tray 16 than would be larger size feed such as sunflower seeds. In one embodiment, the feed conduit tube 14 is thinned about at least a portion of each feed hole 34 so a user can alter and adjust the size of the feed hole 34 thereby adjusting the rate the feed is being dispensed. For example, the top edge of the feed hole 34 is thinned so a user can lengthen the feed hole to increase the flow of feed.

While two feed holes 34 are illustrated, the number of feed holes in the feed conduit tube 14 is dependent upon a number of factors including the size and design of the feed tray, whether the bird feeder includes a single storage container or a plurality of storage containers, the type of feed being dispensed, and the rigidity required so the feed tube 14 is secured to the feed tray 16. For example, for a bird feeder having multiple containers 12 that feed a circular feed tray 16, each feed conduit tube 14 includes a single feed hole 34 located so that the feed is dispensed outward onto the feed tray 16. For rectangular trays, the feed conduit tube 14 includes two feed holes 34 for dispensing bird feed.

Preferably, the feed conduit tube 14 and feed tray 16 are made from plastic materials including polypropolene polyethelene, polystyrene, polycarbonate and KRO, that have sufficient thickness and rigidity so they do appreciably deform under the expected loading conditions. For example, the feed tray 16 should not appreciably deform (e.g., feed tray 16 should not deform spilling out the bird feed) under the weight of the bird seed in the tray under expected weather conditions including the weather conditions normally expected to be seen as well as some storm conditions that one skilled in the art would reasonably expect a bird feeder to withstand without a structural failure. Alternatively, the feed conduit tube 14 and feed tray 16 are made from other materials such as metals (e.g., aluminum, steel) using techniques known in the art for making these parts (e.g., stamping out a metal feed tray).

Figure 2:
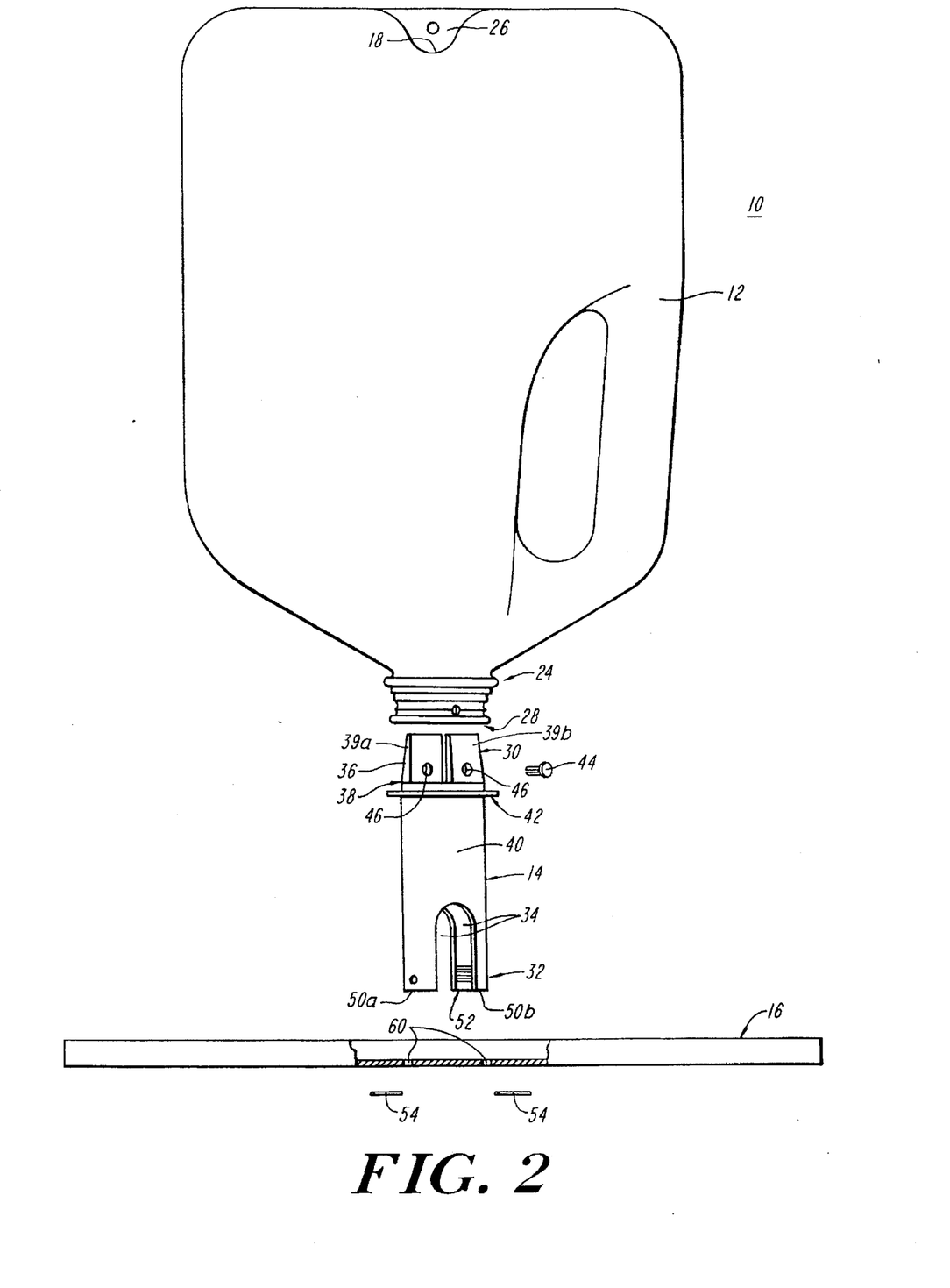
FIG. 2 is an exploded view of a bird feeder.

There is provided in FIG. 2, an exploded view of the bird feeder 10. Reference should also be made to the side view of the feed conduit tube 14 shown in FIG. 3. As provided above, the feed tube first end 30 is secured to the feed storage container neck 24, thereby securing the feed tube 14 to the feed storage container 12.

In a preferred embodiment, the feed tube first end 30 includes a tapered portion 36 that is outwardly tapered from the end of the feed tube 14. The tapered portion 36 extends around the circumference of the feed tube and preferably extends about at least a portion of the circumference of the feed tube 14. More particularly, the tapered portion 36 includes two arcuate sections 39a,b about the circumference of the feed tube 14. While two tapered arcuate sections 39a,b are illustrated, the first end tapered portion 36 may include a plurality of tapered arcuate sections about the circumference, where the number of tapered arcuate sections used is dependent upon the rigidity of the interconnection required to be established to ensure the feed tube 14 and container 12 are secured together.

Figure 3:
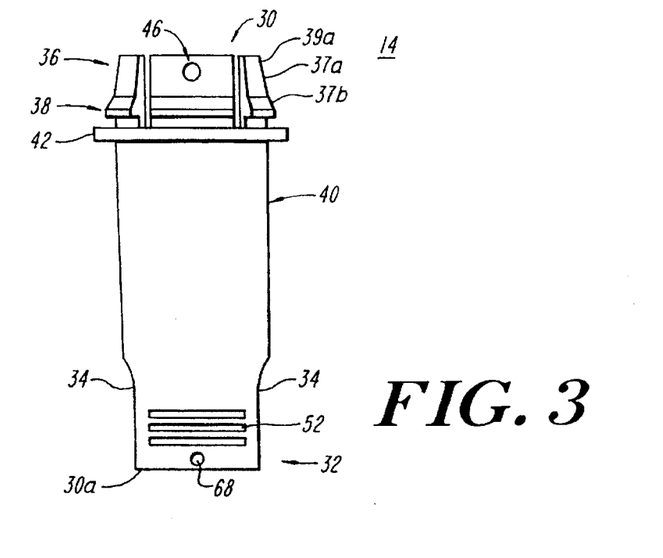
FIG. 3 is a side view of a feed conduit tube according to the present invention.

As shown in FIG. 3, in one embodiment each of the arcuate sections 39a,b, and the tapered portion 36 in general, is defined by upper and lower tapered regions 37a,b, where the upper tapered region 37a is tapered with a shallower taper than is the lower tapered region 37b. The upper and lower tapered regions 37a,b are provided with differing taper angles so the tapered portion 36 is adaptable for insertion into the neck of different size containers. The shallower taper angle of the upper tapered region 37a also makes insertion of the first end 30 (i.e., the tapered portion 36) into the container neck region easier.

The upper tapered region 37a guides the tube first end 30 into the container neck 24 so the tube first end 30 is positioned to be secured to the container neck 24 as discussed below. The lower tapered region 37b further guides the tube first end 30 as it is being inserted or slid into the container neck 24 so the tube first end 30 is secured to the container neck. The sloped surfaces of the upper and lower tapered regions 37a,b engage the interior surfaces of the container neck 24 for most container sizes. The amount of engagement and what surfaces of the upper and/lower tapered regions 37a,b engage the neck interior surfaces is dependent upon the diameter of the neck region (e.g., upper taper region engages neck surfaces when neck diameter is the smaller end of the range).

The tapered portion 36 in conjunction with the flexibility of the two arcuate sections 39a,b permits the first end 30 of the feed tube 14 to be inserted into a variety of sizes of containers (i.e., feed tube tapered portion 36 adaptable for insertion into container necks over a wide range of neck diameters). Also while, two tapered regions 37a,b are illustrated this is not a limitation. The tapered portion 36 may have a single tapered region or a plurality of tapered regions, where the number of taper regions is selected based on ease of manufacturing and for ease of insertion of the tube first end 30 into the container neck 24.

Referring back to FIG. 2, to secure the feed tube 14 to the feed storage container 12, the first end tapered portion 36 is inserted into the mouth of the container neck 24. The tapered portion 36 positions and guides the feed tube first end 30 as it is slid into the container neck 24. Proximate the end of the tapered portion 36 having the widest cross-section or width (i.e., the lower tapered region 37b, FIG. 3) is a projection 38 that extends radially outward from the outer surface 40 of the feed tube 14.

The projection 38 preferably extends around at least a portion of the circumference of the feed tube 14 or about the entire circumference. More particularly, the projection 38 extends about the circumference of each arcuate section 39a,b. The tapered portion 36 is slid into the neck until the projection 38 of each arcuate section 39a,b locks under a ridge of the lip 28 of the mouth of the feed storage container 12. Such a lip 28 is typically provided in blow-molded plastic containers with press on tops or screw on lids.

The feed tube first end 30, and necessarily the feed conduit tube 14 is thereby secured to the feed storage container. When the projection 38 locks into place under the ridge of the lip 28, the feed tube 14 is sufficiently secured to the feed storage container 12 to handle the weight of the feed tray 16, the weight of the dispensed feed and the weight of a bird(s) perched on the feed tray 16 for feeding, as well as any loadings due to the weather. The engagement of the sloping surfaces of the tapered portion 36 with the interior surfaces of the container neck 24, is also a means for securing the tube first end 30 in the neck so it can handle or resist the weight of the feed tray 16.

In another embodiment, at least one security or brace pin 44 is inserted through holes (not shown) in the container neck 24 and through apertures 46 in the feed tube first end 30, more particularly the apertures in the upper tapered section 37a, FIG. 3, of each tapered arcuate section 39a,b, to further secure the feed tube 14 to the feed storage container 12. This provides additional assurance that the feed tube 14 remains connected to the feed storage container 12 particularly where there is a potential for squirrels or other such large animals jumping onto the feed tray 16 to get at the bird feed and also when the feed conduit tube 14 is secured to large diameter circular feed trays 16 (e.g., 24 inch trays) or large rectangular trays. The brace pin 44 is preferably tapered to prevent it from accidently getting or working itself lose (e.g., interference fit with the first end apertures 46). The brace pin 44 may include a head.

Alternatively, the tube first end 30 is secured to the container neck 24 using two brace pins 44 that are preferably tapered pins. Each pin 44 is inserted through one of the holes (not shown) in the container neck 24 and through the corresponding opening in one of the apertures 46 in one of the tube first end arcuate sections 39a,b. In this way, the pins 44, when inserted, do not extend appreciably into the flow passage of the feed conduit tube 14 through which the bird feed flows.

Preferably, the feed tube first end 30 includes tab stops 42 to ensure that the projection 38 is secured under the ridge of the container lip 28 and to prevent the feed tube first end 30 from being pushed to far into the container neck 24. Thus, when the feed tube first end 30 is slid into the mouth of the feed storage container 12, the tab stops 42 contacts the mouth and the lip 28 when the projection 38 is under the ridge of the lip 28.

The tab stops 42 preferably project radially outward from the tube outer surface 40 so a rain shield 48 is placed between the tab stops 42 and the feed storage container 12. A rain shield minimizes to the extent possible, the impingement of rain on the bird feed lying in the feed tray 16. The rain shield 34 can also form a barrier so squirrels and other such animals do not have easy access to the feed tray 16. Each tab stop 42 extends around a portion of the feed tube's circumference and more particularly, about the circumference of each arcuate section 39a,b. Alternatively, the feed tube 14 includes a single tab stop 42 that extends about the entire circumference.

The feed tube second end 32 includes two finger portions 50a,b and at least one feed hole 34. In the illustrated embodiment, two feed holes 34 are provided that are diametrically opposed from each other and pass through the side wall of the feed tube 14. Thus, the effect of gravity causes the bird feed, passing through the interior of the feed tube 14 from the feed storage container 12, to be dispensed on opposite sides of the feed tray 16. In this way, birds can perch on both sides of the feed tray 16 for feeding. As illustrated, the opening for each of the feed holes 34 is arched at the top and includes vertical sides. The bottom of the opening is formed by the feed tray 16.

While two finger portions 50a,b and two feed holes 34 are illustrated, this is not a limitation. The tube second end 32 may include a plurality of finger portions 50a,b, where the number selected is dependent upon: the required flexibility of each finger portion 50a, so it can be detached by a user; the required stiffness and rigidity of each finger portion 50a,b, so the feed tray 16 remains secured to the feed conduit tube 14; the thickness and strength of the material being used for the feed conduit tube; the number of feed holes 34 in the feed conduit tube; the number of feed conduit tubes 14 connected to a feed tray 16, and the design of the feed tray. For the number of feed holes 34, see the discussion above concerning FIG. 1.

Each finger portion 50a, includes at least one and preferably at least two notches 52 proximate the end of each finger portion 50a. The location of the notches 52 in each finger portion 50a is established based on the location of the corresponding notches provided in the arcuate through openings 60a,b of the feed tray 16 (see FIG. 4A). The notch locations are also established so the desired size and configuration of the opening for the feed holes 34 is obtained. As shown in FIGS. 2–3, the notches 52 are disposed on the outside or inside surface of each finger portion 50a,b. Alternate configurations and embodiments of the feed conduit tube 14 and feed tray 16 are discussed in connection with FIGS. 7,8.

The notches 52 in each of the finger portions 50a,b and the notches or beveled surfaces provided in the corresponding feed tray arcuate through openings 60a,b cooperate so that the feed tray 16 is secured to the feed tube 14 when the finger portions 50a,b are inserted into the tray arcuate through openings 60a,b. When so secured, the feed tray 16 remains firmly attached in all weather and feeding conditions.

The finger portions 50a,b, however, have sufficient flexibility so a user can disengage the finger portion notches 52 from the cooperating surface (e.g., notches) in the arcuate through openings 60a,b. In this way, a user can remove a feed tray 16 of one size and/or configuration and replace it with a feed tray having a different size or configuration as well as allowing for the replacement of a damaged feed tray 16.

Thus, the design of the means for securing the feed tray 16 to the feed tube second end has the flexibility so a user can select and adjust the tray size and configuration to correspond with the size and number of birds intended to be attracted to and feed by the bird feeder 10. For example, a larger diameter circular feed tray is replaced with a smaller diameter feed tray when one wants to attract smaller birds like a chickadee instead of a crow.

In an alternate embodiment, a second or security pin 54 is inserted through holes 68, FIG. 3, that are provided in the finger portions 50a,b which extend below the feed tray 16. The second security pin 54 is preferably a straight pin and is inserted through the finger portion holes 68 beneath the feed tray 16. The security pin 54 extends radially outward from the finger portions 50a,b to support/engage the bottom surface of the feed tray 16. The second security pin 54 provides additional assurance that the feed tray 14 remains connected to the feed tube 14 particularly where there is a potential for squirrels or other such large animals jumping on the feed tray 16 which might cause the feed tray 16 to come off or to be pulled off. The security pin 54 also provides additional assurance that a large diameter tray (e.g., 24 inch diameter circular trays) remains secured to the feed conduit tube 14 especially when the tray is used in conjunction with a single feed container 12. In this way, when a bird alights or perches on the tray 16, it does not become unstable, thereby scaring the bird off.

Figure 4A:
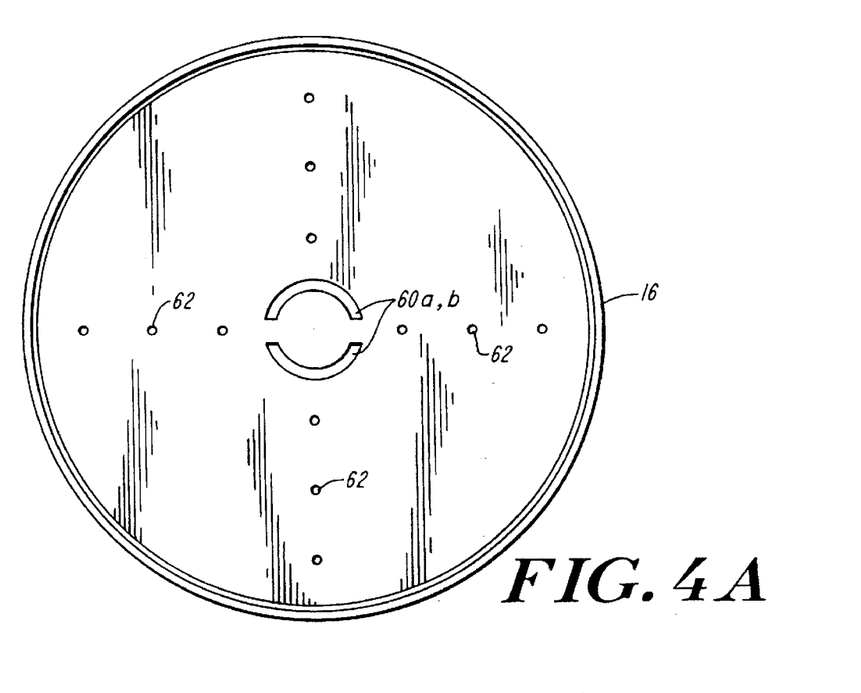
FIGS. 4A, B are top and side views respectively of a circular tray.
Figure 4B:
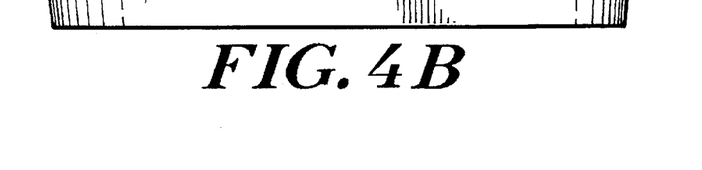

One feed tray configuration, a circular feed tray 16 is shown in FIGS. 4A, B. The circular feed tray 16 is designed so bird feed, as it exits from the feed tube feed holes 34, spreads evenly around the feed tray 16 to attract birds. The bird feed is retained in the feed tray 16 as it is dispensed out of the feed holes 34 by the tray side edge 64 that extends around the circumference of the feed tray 16. The side edge 64 also provides a perch for the feeding bird(s).

The feed tray 16 includes a plurality of drain holes 62 to allow moisture, such as rain, to drain from the feed. The drain hole size and spacing is adequate to remove water/moisture accumulation yet the hole is small enough so the bird fee or pelleted food in the tray 16 does not generally pass through. As provided in the discussion above concerning FIG. 2, the feed tray includes at least two arcuate through hole openings 60a,b to receive the finger portions 50a,b of the feed tube second end 32.

Figure 7:
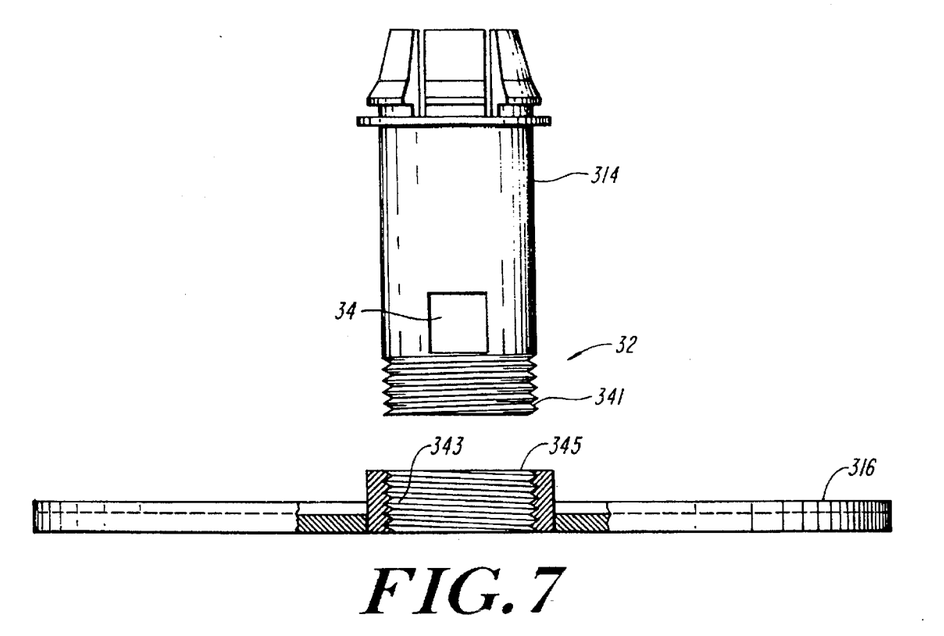
FIG. 7 is an exploded view of an alternate embodiment for a feed tube and feed tray of the present invention.
Figure 8:
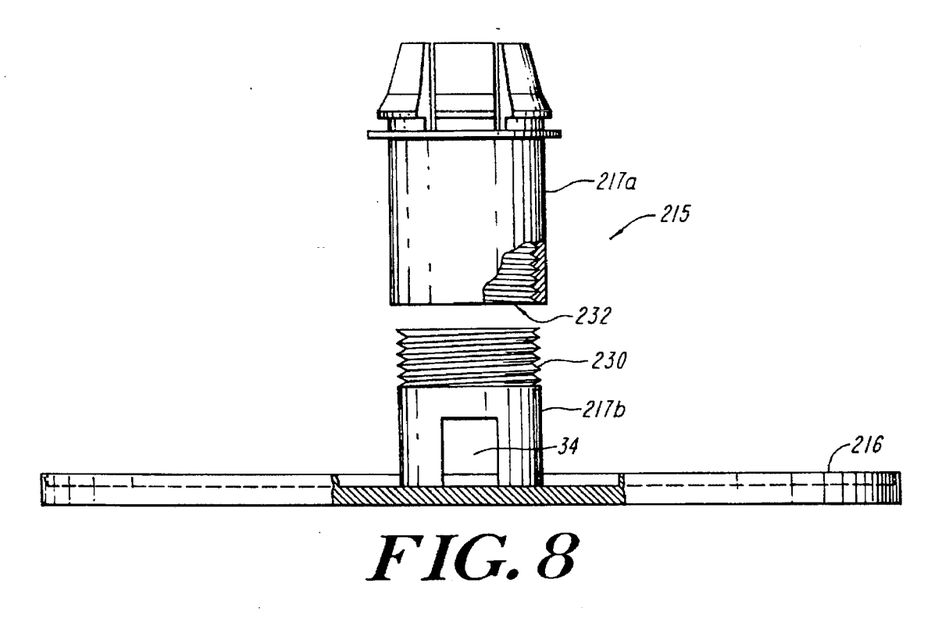
FIG. 8 is an exploded view of another embodiment for a feed tube and feed tray of the present invention.

The circular feed tray 16 is selected from any of a number of diameters in the range of from about 6 inches in diameter to 24 inches. Feed trays 16 with diameters greater than 12 inches and more particularly in the range of 12–24 inches are useable, but depending on the particular site conditions (e.g., birds, location of feeder, etc.) additional support for these trays 16 is provided by a security pin 54 disposed below the tray 16 as described hereinabove or by using an alternate feed tube/feed tray configuration (FIGS. 7,8). While a single container 12 is illustrated, as discussed below in connection with FIGS. 5A,B, the circular tray 16 is configurable with a plurality of arcuate through hole openings 60a,b so a plurality of containers 12 are connectable to the tray 16. In this case the through hole openings 60a,b are arranged so the bird feeder 10 is relatively stable and the feed tray 16 is not tipped when secured to the containers.

Figure 5A:
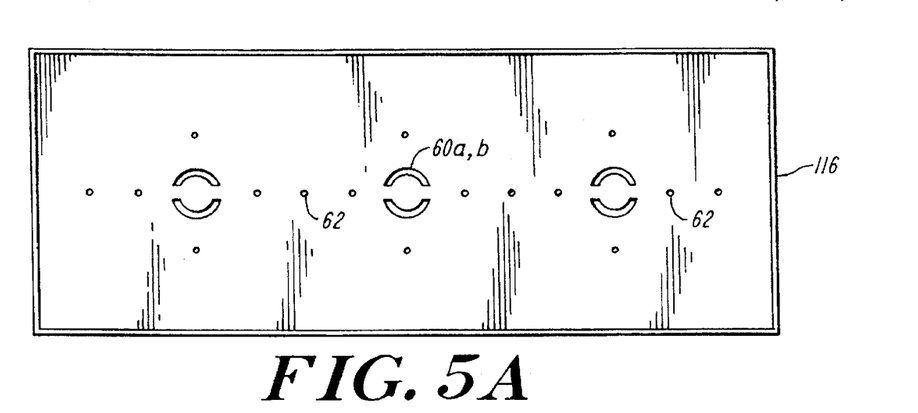
FIGS. 5A, B are top and side views respectively of a rectangular tray.
Figure 5B:
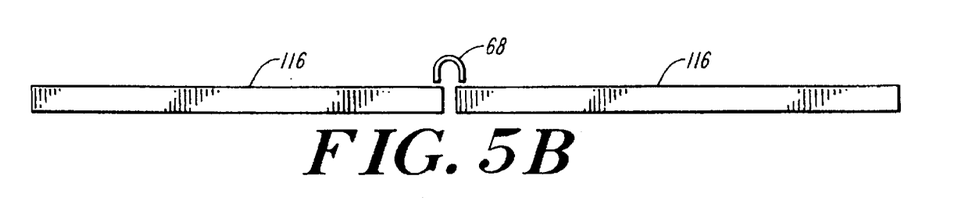

Another feed tray embodiment, a rectangular feed tray 116 is shown in FIGS. 5A, B. In this embodiment, a plurality of feed storage containers 112 feed the feed tray 116 (See FIG. 6). The illustrated feed tray 116 includes three pairs of arcuate through hole openings 60a,b to receive the finger portions 50a,b of each feed tube 114 being connected to the feed tray 116. As with the circular feed tray 16, a rectangular feed tray 116 includes a plurality of drain holes 62 and a tray side edge 64 that extends about perimeter of the rectangular feed tray 116. While configuring a rectangular tray 116 to receive three feed storage containers 120 is illustrated, the tray 116 is configurable to receive one or a plurality of feed storage containers. As shown in FIG. 5B, separate rectangular trays 116 may be interlocked together by means of a clip 68 to form a bird feeder comprising and assemblage of feed trays and feed storage containers.

The width and length of a rectangular feed tray 116, may be any of a number of combinations, but as a practical matter the width and length are established based on the size of the birds to be feed. For example, in an exemplary embodiment, the width of the rectangular tray 116 is from about 8 inches to about 10 inches, although the tray 116 is configurable to with a width greater than 10 inches. The length of the tray 116 is dependent upon the number of feed containers 112 feeding the tray 116 (i.e, the more containers 112 there are the longer the tray 116 can be). For a single container rectangular tray 116, the tray length is from about 10 to about 12 inches and for multiple container 112 applications, the length of the tray 116 typically is from about 12 to 48 inches. The length for multiple container applications is, however, dependent upon the number and type of storage containers 112 being used. As provided above, separate rectangular trays 116 may be interlocked by a clip 68 to form an assemblage of trays of any length. The trays being interlocked are trays that are feed by a single storage 12 or by multiple storage containers 112.

While circular and rectangular trays are illustrated (see FIGS. 4A,B; 5A,B) this is not a limitation. The feed tray is configurable to have any geometric shape, including any type of polygonal such as hexagons and octagons, that can be designed to retain bird seed for feeding and which provides an adequate feeding area for the size and type of bird being attracted to and feed by the bird feeder of the instant invention.

A bird feeder 100 having a plurality of feed storage containers 112 to feed a single feed tray 116 is shown in FIG. 6. For this embodiment, a plurality of feed conduit tubes 114, one for each feed storage container 112, interconnect the feed storage containers 112 to the feed tray 116. As noted above, a feed tray having any geometrical shape, including circular, rectangular, hexagonal and octagonal, may be used with multiple storage containers 112.

The multiple container bird feeder 100 is hung from its intended location (e.g., tree branch) in one of a number fashions. For example, all the storage containers 112 are connected to an intermediate rigid rod 120 and the rod 120 is interconnected to the hanging fixture.

Alternate embodiments of the feed tube and feed tray are shown in FIGS. 7 and 8 respectively. As shown in FIG. 7, the feed conduit tube 314 and feed tray 316 are threadably interconnected. The feed tube second end 32 includes a threaded end 341 to engage the threads 343 in the threaded aperture 345 of the feed tray 316. Thus, to assemble the feed tray 316 and feed tube 314 the threaded end 341 of the feed tube 314 is screwed into the tray threaded aperture 345. As also illustrated, the top edge of the feed hole 34 is a straight edge as well as the arcuate edge as shown in FIG. 1.

The threaded connection between the feed tube 314 and feed tray 316, is a strong and rigid interconnection. Such an interconnection permits larger diameter circular trays, and larger trays in general, to be secured to the feed tube 314 without needing a security pin 54 for additional support and thereby also creates a stable perch for the birds. The threaded connection maintains the flexibility for a user to easily adapt the bird feeder with different size trays (e.g., one tray can be screwed off and another screwed on in its place). The tube threaded end 341 is a continuous tubular member, or as is known in the art, the threaded end 341 is threaded finger portions.

In yet a further embodiment, FIG. 8, the feed tube 215 is in two sections, an upper section 217a and a lower section 217b, where the upper and lower sections are connected to each other by means of a threaded connection. For example, the lower section 217b includes a threaded end 230 that engages the threads in the aperture 232 of one end of the upper feed tube section 217a. Alternatively, the upper and lower feed tube sections 217a,b are interconnected using any other means known in the art, such as a pop-lock type of connection, where the two feed tube sections 217a,b preferably are detached or disconnected from each other and re-secured or re-connected without the use of special tools or equipment.

The tube lower section 217b is secured to the feed tray 216 by gluing, or other means known in the art for establishing a permanent, rigid connection between the two parts 216,217b. For example, an epoxy glue is applied to the end of the feed tube lower section 217b being secured to the feed tray 216 so once the epoxy hardens the two parts are joined to form a unitary structure. Alternatively, a single part is made that integrates both the feed tube lower section 217b and feed tray 216. For example, a plastic part is molded or a metal part is formed that includes the features of the feed tube lower section 217b and the feed tray 216.

As provided in the discussion above concerning FIG. 7, the threaded connection between the upper and lower sections 217a,b establishes a strong connection between the feed tube 215 and the feed tray 216 allowing larger diameter or larger sized trays to be used without a security pin 54. The stronger connection also means that, for any size tray, the perch is more stable when the bird alights on the feed tray 216.

The threaded connection maintains the flexibility to easily adapt the bird feeder with a different size trays, since an integral feed tray 216 and a lower tube section 217b can be replace with another size tray having a corresponding lower tube section. The separation of the feed conduit tube into two sections 217a,b advantageously permits the container to be refilled without first having to remove the upper section 217a from the container neck (e.g., the feed can be poured into container through the upper section 217a.

While a preferred embodiment of the invention has been described using specific terms, such description is for illustrative purposes only, and it is to be understood that changes and variations may be made without departing from the spirit or scope of the following claims.

What is claimed is:

1. A bird feeder feed conduit for interconnecting to a container of bird feed, having an open ended neck with a lip internal thereto, and to a tray so bird feed is dispensed from the container and onto the tray, said feed conduit comprising:

a hollow tube having first and second ends;

wherein said first end includes a tapered end portion that guides and positions said first end within the container neck when said first end is inserted therein, and a locking lip that is proximate said tapered end portion and extends outward from an outer surface of said tube;

wherein said tapered end portion and said locking lip are configured so the locking lip engages the inside lip of the container neck when said first end is inserted therein, thereby securing said hollow tube to the container;

wherein said hollow tube includes at least one aperture through the outer surface of said tube, so the bird feed passes through each of said at least one aperture onto the tray; and wherein said second end includes a second end securing means for securing the second end of said tube to the tray.

2. The bird feeder feed conduit of claim 1, wherein said hollow tube further includes stops extending from the tube outer surface, and wherein said stops and said locking lip are configured so said stops abut the open end of the container neck when said locking lip engages the internal lip of the container neck.

3. The bird feeder feed conduit of claim 2, wherein there are two diametrically opposed apertures in the tube outer surface for dispensing feed to the tray.

4. The bird feeder feed conduit of claim 1, wherein said locking lip extends circumferentially about at least a portion of the tube outer surface.

5. The bird feeder feed conduit of claim 1, further including at least one tapered pin, and wherein said tapered portion includes a through aperture transverse to and passing through the tube outer surface, where said at least one pin can be passed through the neck of the container and said through aperture thereby further securing said hollow tube to the container neck.

6. The bird feeder feed conduit of claim 1, wherein said second end securing means includes at least two finger portions extending in a direction parallel to a longitudinal axis of said tube, each said at least two finger portions including at least one ridge, that secures said second tube end to the tray, when each finger portion is inserted into a corresponding receptacle in the tray.

7. The bird feeder feed conduit of claim 6, wherein there are two ridges for each finger portion for securing said second tube end to the tray.

8. The bird feeder feed conduit of claim 6, wherein each said finger portion extends below the tray, wherein each finger portion below the tray for at least one opposing pair of said finger portions includes an aperture transverse and radial to the tube longitudinal axis, and wherein said feed conduit further includes a pin that is passed through said apertures thereby providing further support for the tray.

9. A bird feeding device for interconnecting to at least one storage container of bird feed, each container having an open ended neck with a lip internal thereto, said feeding device comprising:

at least one hollow tube, one for each storage container, and each having first and second ends;

a feeding tray;

wherein said first end of each hollow tube includes a tapered end portion that guides and positions said first end within the container neck when said first end is inserted therein, and a locking lip that is proximate said tapered end portion and extends outward from an outer surface of said tube;

wherein said tapered end portion and said locking lip are configured so the locking lip engages the inside lip of the container neck when said first end is inserted therein, thereby securing said hollow tube to the container;

wherein each of said at least one hollow tube includes at least one aperture through the outer surface of said tube, so the bird feed passes through each of said at least one aperture onto the tray; and wherein said second end of each said at least one hollow tube includes a second end securing means for securing said second end to the tray.

10. The bird feeder feed conduit of claim 9, wherein each of said at least one hollow tube further includes stops extending from the tube outer surface, and wherein said stops and said locking lip are configured so said stops abut the open end of the container neck when said locking lip engages the internal lip of the container neck.

11. The feeding device of claim 9, further including a weather shield member that is secured to each of said at least one hollow tube and which is configured so as to shield said feeding tray.

12. The feeding device of claim 9, wherein said locking lip extends circumferentially about at least a portion of the tube outer surface.

13. The feeding device of claim 9, further including at least one tapered pin for each hollow tube, and wherein each said tapered portion includes a through aperture transverse to and passing through the tube outer surface, where said at least one tapered pin can be passed through the container neck and said through aperture thereby further securing said hollow tube to the container neck.

14. The feeding device of claim 13, further including two tapered pins for each hollow tube, and wherein each pin can be passed through the neck of the container and into an end of said through aperture thereby further securing said hollow tube to the container neck.

15. The feeding device of claim 9, further including weather shield means, secured to said hollow tube, for shielding said feeding tray.

16. A bird feeding device for interconnecting to at least one storage container of bird feed, each container having an open ended neck with a lip internal thereto, said feeding device comprising:

at least one hollow tube, one for each storage container, and each having first and second ends;

a feeding tray having a feeding surface;

wherein said first end of each hollow tube includes a tapered end portion that guides and positions said first end within the container neck when said first end is inserted therein and a locking lip that is proximate said tapered end portion and extends outward from an outer surface of said tube;

wherein said tapered end portion and said locking lip are configured so the locking lip engages the inside lip of the container neck when said first end is inserted therein, thereby securing said hollow tube to the container;

wherein the feeding tray includes at least one hollow tubular section extending essentially normal to the feeding surface and each tubular section having a first end;

wherein said second end securing means includes means for removably securing said tubular section first end to said hollow tube second end; and wherein each of said at least one hollow tubular section includes at least one aperture through the outer surface of said tube, so the bird feed passes through each of said at least one aperture onto the feeding surface.

17. The feeding device of claim 16, wherein one of said tabular section first end of said hollow tube second end includes a male threaded connection and wherein the other of said tubular section first end and said hollow tube second end includes a female threaded connection so said tubular section first end and said hollow tube second end are threadably secured.

18. The feeding device of claim 11, wherein said second end securing means includes a pop-lock connection for removable securing said tubular section first end to said hollow tube second end.

19. The feeding device of claim 16, wherein there are two diametrically opposed apertures through said hollow tubular section.

20. The feeding device of claim 16, wherein said feeding device further includes a plurality of hollow tubes for attaching to a plurality of storage containers, and wherein said removable securing means secures each hollow tube second end to said feeding tray.

21. The feeding device of claim 16, wherein said feeding device further includes a plurality of hollow tubes for attaching to a plurality of storage containers and; wherein the feeding tray includes a plurality of hollow tubular sections each extending from the feeding surface; and wherein said removable securing means secures each hollow tube second end to each said hollow tubular section first end.

22. The feeding device of claim 21, wherein one of said tubular section first end and said hollow tube second end includes a male threaded connection and wherein the other of said tubular section first end and said hollow tube second end includes a female threaded connection so each of said tubular section first ends and each of said hollow tube second ends are threadably secured.

23. The feeding device of claim 16, wherein each of said at least one hollow tubular section and said tray section are bonded together to form a unitary structure.

24. The feeding device of claim 16, wherein each of said at least one hollow tubular section and said tray section are integrally molded as a unitary structure.

25. The feeding device of claim 16, wherein each of said at least one hollow tubular section and said tray section are integrally formed as a unitary structure.

26. A bird feeder comprising:
at least one container for holding bird feed, each container having a neck;
at least one hollow tube, one for each storage container, and each having first and second ends;
a feeding tray;
wherein said first end of each hollow tube includes a tapered end portion that guides and positions said first end within the container neck, and a locking lip that is proximate said tapered end portion and extends outward from an outer surface of said tube;
wherein said tapered end portion and said locking lip are configured so the locking lip engages the inside lip of the container neck when said first end is inserted therein, thereby securing said hollow tube to the container;
wherein each of said at least one hollow tube includes at least one aperture through the outer surface of said tube, so the bird feed passes through each of said at least one aperture onto the tray; and
wherein said second end of each said at least one hollow tube includes a second end securing means for securing said second end to the tray.

27. The bird feeder of claim 26, wherein said locking lip extends circumferentially about at least a portion of the tube outer surface.

28. The bird feeder feed conduit of claim 27, wherein each of said at least one hollow tube further includes stops extending from the tube outer surface, and wherein said stops and said locking lip are configured so said stops abut the open end of the container neck when said locking lip engages the internal lip of the container neck.

29. The bird feeder of claim 26, further including:
a plurality of containers;
a plurality of feed tubes; and
wherein said feed tray includes a plurality of feed tube tray attachment points to receive said plurality of feed tubes.

30. The feeding device of claim 26, wherein said feeding tray includes:
a tray section having a feeding surface;
at least one hollow tubular section, each extending essentially normal to the feeding surface and having a first end; and
wherein one of said tubular section first end and said hollow tube second end includes a male threaded connection and wherein the other of said tubular section first end and said hollow tube second end includes a female threaded connection so said at least one hollow tubular section is threadably secured to said at least one hollow tube.

31. The bird feeder of claim 30, further including at least one tapered pin for each hollow tube, wherein each said tapered portion includes a through aperture transverse to and passing through the tube outer surface, where said at least one tapered pin is passed through the neck of the container and said through aperture thereby further securing said at least one hollow tube to said at least one container.

32. The bird feeder of claim 30, wherein each said hollow tubular section includes at least one aperture therethrough, where the bird feed passes through said at least one aperture onto said tray section.

33. The bird feeder of claim 32, wherein there are two diametrically opposed apertures through each of said at least one hollow tubular section.

34. The bird feeder of claim 30, wherein said tray section is a circular tray.

35. The bird feeder of claim 34, wherein said circular tray is selected from a range of diameters from about 6 inches to about 24 inches.

36. The bird feeder of claim 30, wherein said tray section is rectangular in shape.

37. The bird feeder of claim 36, wherein said rectangular shaped tray section has a width in the range of from about 8 inches to about 10 inches and a length in the range of from about 10 inches to about 24 inches.

38. The feeding device of claim 30, wherein each of said at least one hollow tubular section and said tray section are bonded together to form a unitary structure.

39. The feeding device of claim 30, wherein each of said at least one hollow tubular section and said tray section are integrally molded as a unitary structure.

40. The feeding device of claim 30, wherein each of said at least one hollow tubular section and said tray section are integrally formed as a unitary structure.

41. The feeding device of claim 30, further including a weather shield member that is secured to each of said at least one hollow tube and which is configured so as to shield said feeding tray.

* * * * *